United States Patent
Meijer et al.

(10) Patent No.: US 8,829,151 B2
(45) Date of Patent: *Sep. 9, 2014

(54) COATING COMPOSITION COMPRISING A REACTIVE DILUENT OF POLYUNSATURATED ALCOHOL ESTER

(75) Inventors: Michel Daniel Meijer, Leiden (NL); Gijsbert Pieter Mes, Bennekom (NL); Hendrik Philip Kelders, Rijnsaterwoude (NL); Robert Paul Klassen, Amsterdam (NL); Adrianus Jozefus Hendricus Lansbergen, Oosterbeek (NL); Martin Leonhard Spierenburg, Apeldoom (NL)

(73) Assignee: Akzo Nobel Coatings International B.V., Arnhem (NL)

( * ) Notice: Subject to any disclaimer, the term of this patent is extended or adjusted under 35 U.S.C. 154(b) by 760 days.

This patent is subject to a terminal disclaimer.

(21) Appl. No.: 12/295,356

(22) PCT Filed: Mar. 23, 2007

(86) PCT No.: PCT/EP2007/052822
§ 371 (c)(1),
(2), (4) Date: Feb. 10, 2009

(87) PCT Pub. No.: WO2007/113146
PCT Pub. Date: Oct. 11, 2007

(65) Prior Publication Data
US 2009/0306286 A1    Dec. 10, 2009

(30) Foreign Application Priority Data
Mar. 30, 2006 (EP) .................................. 06111960

(51) Int. Cl.
*C08G 63/123* (2006.01)
*C08G 63/199* (2006.01)

(52) U.S. Cl.
USPC ........ 528/272; 528/271; 528/245.3; 528/230; 525/7; 525/7.3; 525/7.4

(58) Field of Classification Search
USPC ............. 525/7, 7.3, 7.4; 528/271, 272, 245.3, 528/230
See application file for complete search history.

(56) References Cited

U.S. PATENT DOCUMENTS 4,523,007 A * 6/1985 Schipfer et al. ............... 528/227
4,865,705 A    9/1989 Hendrikx et al.
5,412,062 A * 5/1995 Power et al. .................. 528/272

FOREIGN PATENT DOCUMENTS

| EP | 0 357 128 | 3/1990 |
| WO | WO 97/02226 | 1/1997 |
| WO | WO 97/02230 | 1/1997 |
| WO | WO 98/00387 | 1/1998 |
| WO | 2004/099329 | * 11/2004 |

OTHER PUBLICATIONS

Kastner, Colloids and Surfaces, 183-185 (2001) 805-821.*
Nakayama, Progress in Organic Coatings 33 (1998) 108-116.*
International Search Report and Written Opinion of the International Searching Authority, PCT International Application No. PCT/EP2007/052822, dated Jun. 13, 2007.

* cited by examiner

*Primary Examiner* — Robert C Boyle
(74) *Attorney, Agent, or Firm* — Kenyon & Kenyon LLP

(57) ABSTRACT

Coating composition comprising an oxidatively drying binder and a reactive diluent. The diluent is an ester of a polyunsaturated alcohol, the ester being without chain-end double bonds. The alcohol can selected from the group comprising geraniol, nerol, citronellol, and farnesol. The ester can be a di-ester of a dicarboxylic acid, such as malonic acid or a polyester comprising at least one terminal malonate group.

10 Claims, No Drawings

COATING COMPOSITION COMPRISING A REACTIVE DILUENT OF POLYUNSATURATED ALCOHOL ESTER

The present invention relates to a coating composition comprising a reactive diluent and an oxidatively crosslinkable binder system, such as an alkyd binder.

Oxidatively crosslinkable binders are binders which crosslink on exposure to oxygen. Examples of such binders are polymers which contain residues of aliphatic compounds, e.g., unsaturated fatty acid residues. The unsaturation in polymers from such fatty acid groups imparts latent crosslinkability, so that when a coating composition based on such a binder is exposed to air, the binder undergoes crosslinking, thereby improving the coating's properties such as hardness, durability, and chemical resistance. A particular advantage of coatings based on binders with unsaturated fatty acid residues is an improved glossy appearance.

Oxidatively crosslinkable binders can be polymers of any type, such as polyurethanes or acrylates, comprising unsaturated fatty acid groups. Typical examples of commonly used oxidatively crosslinkable binders are alkyds. Alkyds are well known-binders of decorative paints curable under the influence of oxygen and can be prepared by esterification from polybasic acids or anhydrides, polyols, and fatty acids. Alkyd resins are generally used in coating compositions which ordinarily contain large amounts of solvents. Since solvents evaporate after application of the paint, they form an environmental and health problem.

To reduce the volatile content in solvent borne paints, it has been proposed to use reactive diluents. A feature of reactive diluents is that such diluents can copolymerize with the used binder system. This way, reactive diluents can be used to replace part or all of the traditional solvents normally used in such formulations, thereby reducing emission of solvents on drying of the coating.

Reactive diluents usually are compounds or mixtures of compounds of relatively low viscosity and a relatively high boiling point which act as solvents during the formulation and processing of the coating. Reactive diluents for paint systems have been disclosed in, e.g., EP-A-0 357 128. The drawback of these reactive diluents is that they generate acrolein, a toxic volatile, as a side reaction of oxidative drying.

In WO 97/02230, WO 97/02226, and WO 98/00387, reactive diluents based on esters and ethers of 2,7-octadienol have been proposed. It was found that these induce severe yellowing and embrittlement upon aging of the paint film.

The object of the invention is to find reactive diluents particularly useful for paints which do not form toxic volatiles with oxidative drying, result in good viscosity reduction, and do not affect properties like drying behaviour, hardness, yellowing, and durability.

The object of the invention is achieved by a coating composition comprising an oxidatively drying binder and a reactive diluent which is at least partly an ester of a polyunsaturated alcohol and a compound comprising at least one carboxylic acid group, the ester being without chain-end double bonds. Surprisingly, it has been found that the use of such diluents, which do not release acroleins or other toxic volatiles upon oxidative drying, can result in paints with improved film hardness and reduced wrinkling and yellowing.

The alcohol can for example be selected from the group comprising geraniol, farnesol, citronellol, and nerol.

The carboxylic acid compound can be a mono- or polycarboxylic acid, such as a dicarboxylic acid, resulting in a di-ester. The carboxylic acid compound can for example be malonic acid, succinic acid, itaconic acid, isophthalic acid, carbonic acid, naphthalene dicarboxylic acid, cyclohexane dicarboxylic acid, tetrahydrophthalic acid or their anhydrides. Optionally, the ester is a malonate, e.g., a polymalonate. This opens up the possibility to add aldehyde building blocks by Knoevenagel reaction, such as citronellal, isobutyraldehyde, benzaldehyde, or cynnamaldehyde. A Knoevenagel reaction is a nucleophilic addition of an active hydrogen compound to a carbonyl group followed by a dehydration reaction in which a molecule of water is eliminated. In this reaction the carbonyl group is an aldehyde or a ketone. Usually a weakly basic amine is used as a catalyst.

Also polyesters having two terminal groups with unreacted carboxylic acid moieties, e.g., terminal malonate groups, are suitable di-carboxylic acids to obtain a reactive diluent according to the present invention.

The ester can further comprise one or more polyol building blocks, such as diols or triols. Examples of suitable diols are ethylene glycol, 1,3-propane diol, 1,6-hexane diol, 1,12-dodecane diol, 3-methyl-1,5-pentane diol, 2,2,4-trimethyl-1,6-hexane diol, 2,2-dimethyl-1,3-propane diol or 2-ethyl-2-butyl-1,3-propane diol. Linear diols yield lower-viscosity diluents, whereas triols and cyclo-alkyl polyols, such as cyclohexane-1,4-dimethanol, or aryl polyols, such as benzene-1,4-dimethanol or hydrogenated bisphenol-A, yield higher-viscosity diluents with a higher hardness or better drying properties.

Typical oxidatively crosslinkable binders are alkyd resins. At least a part of the alkyd resin is oxidatively crosslinkable as a result of the incorporation of unsaturated, aliphatic compounds. The unsaturated aliphatic compounds can be unsaturated fatty acids, such as polyunsaturated fatty acids. Examples of fatty acids comprising one equivalent of unsaturated CC bonds are myristoleic acid, palmitoleic acid, oleic acid, gadoleic acid, erucic acid, and ricinoleic acid, and mixtures thereof. Examples of fatty acids comprising two or more equivalents of unsaturated CC bonds include linoleic fatty acid, linolenic fatty acid, elaeostearic fatty acid, licanic fatty acid, arachidonic fatty acid, clupanodonic fatty acid, nisinic fatty acid, and mixtures thereof. Fatty acids containing conjugated double bonds, such as dehydrated castor oil fatty acid, wood oil fatty acid and/or calendula oil fatty acid, can be used as well. Fatty acids derived from soya oil are especially suitable.

Examples of suitable divalent polyol compounds are ethylene glycol, 1,3-propane diol, 1,6-hexane diol, 1,12-dodecane diol, 3-methyl-1,5-pentane diol, 2,2,4-trimethyl-1,6-hexane diol, 2,2-dimethyl-1,3-propane diol, and 2-methyl-2-cyclohexyl-1,3-propane diol. Examples of suitable triols are glycerol, trimethylol ethane, and trimethylol propane. Suitable polyols having more than 3 hydroxyl groups are pentaerythritol, sorbitol, and etherification products of the compounds in question, such as ditrimethylol propane and di-, tri-, and tetrapentaerythritol. Optionally, use is made of compounds having 3-12 carbon atoms, e.g., glycerol, pentaerythritol and/or dipentaerythritol.

Alternatively or additionally, polycarboxylic acids can be used as building blocks for the oxidatively drying polyunsaturated condensation products. Examples of suitable polycarboxylic acids include phthalic acid, citric acid, fumaric acid, mesaconic acid, maleic acid, citraconic acid, isophthalic acid, terephthalic acid, 5-tert. butyl isophthalic acid, trimellitic acid, pyromellitic acid, succinic acid, adipic acid, 2,2,4-trimethyl adipic acid, azelaic acid, sebacic acid, dimerized fatty acids, cyclopentane-1,2-dicarboxylic acid, cyclohexane-1,2-dicarboxylic acid, 4-methylcyclohexane-1,2-dicarboxylic acid, tetrahydrophthalic acid, endomethylene-cyclohexane- 1,2-dicarboxylic acid, butane-1,2,3,4-tetra-carboxylic acid, endoisopropylidene-cyclohexane-1,2-dicarboxylic acid, cyclo-hexane-1,2,4,5-tetracarboxylic acid, and butane-1,2,3,4-tetracarboxylic acid. If so desired, the carboxylic acids in question may be used as anhydrides or in the form of an ester, e.g., an ester of an alcohol having 1-4 carbon atoms.

Optionally, the oxidatively drying polyunsaturated condensation product may comprise other building blocks, which can for example be derived from monocarboxylic acids such as pivalic acid, 2-ethylhexanoic acid, lauric acid, palmitic acid, stearic acid, 4-tert. butyl-benzoic acid, cyclopentane carboxylic acid, naphthenic acid, cyclohexane carboxylic acid, 2,4-dimethyl benzoic acid, 2-methyl benzoic acid, benzoic acid, 2,2-dimethylol propionic acid, tetrahydrobenzoic acid, and hydrogenated or non-hydrogenated abietic acid or its isomer. If so desired, the monocarboxylic acids in question may be used wholly or in part as triglyceride, e.g., as vegetable oil, in the preparation of the alkyd resin. If so desired, mixtures of two or more of such monocarboxylic acids or triglycerides may be employed.

Optionally, isocyanates may also be used as building blocks for the oxidatively drying polyunsaturated condensation product. Suitable isocyanates are for example diisocyanates, such as 1,6-hexane diisocyanate, isophorone diisocyanate, toluene diisocyanate, diphenyl diisocyanate, and dicyclohexylmethane diisocyanate. Triisocyanates can also be used.

The unsaturated groups in the oxidatively drying polyunsaturated condensation product can be introduced by the fatty acids, but may, alternatively or additionally, be introduced by one or more of the polyols, carboxylic acids or anhydrides or other building blocks used, such as fatty mono-alcohols.

The oxidatively drying polyunsaturated condensation product can for instance have pendant groups in an amount of more than 20%, e.g., more than 50%, or more than 65% by weight of the condensation product.

A specific example of a suitable alkyd is the condensation product of soya oil, phthalic anhydride, and pentaerythritol.

The alkyd resins can be obtained by direct esterification of the constituent components, with the option of a portion of these components having been converted already into ester diols or polyester diols. Alternatively, the unsaturated fatty acids can be added in the form of a drying oil, such as sunflower oil, linseed oil, tuna fish oil, dehydrated castor oil, coconut oil, and dehydrated coconut oil. Transesterification with the polyols and, optionally, other building blocks will then give the final alkyd resin. This transesterification generally takes place at a temperature in the range of 115 to 250° C., optionally with solvents such as toluene and/or xylene also present. The reaction generally is carried out in the presence of a catalytic amount of a transesterification catalyst. Examples of transesterification catalysts suitable for use include acids such as p-toluene sulphonic acid, a basic compound such as an amine, or compounds such as calcium oxide, zinc oxide, tetraisopropyl orthotitanate, dibutyl tin oxide, and triphenyl benzyl phosphonium chloride.

Optionally, the oxidatively drying binder may be used in combination with other resins, for example acrylic resins or polyurethanes. Such a mixed binder system can for example comprise at least 20 wt. % of oxidatively drying binder, e.g., more than 60 wt. % of total binder.

The number average molecular weight Mw of the binder will generally be above 150, e.g., higher than 1,000 or higher than 5,000. For reasons of viscosity, the number average molecular weight will generally be below 120,000, e.g., below 80,000.

Alkyds are often characterized by their oil length. Oil length is defined as the weight percentage of fatty acid building blocks (calculated as their triglycerides) in the alkyd resin. Long oil lengths (55% or higher) result in improved oxidative drying, good substrate adhesion, excellent flow properties, good solubility in aliphatic solvents, and low viscosity, even with low solvent content. However, these alkyds show strong yellowing. Medium oil length alkyds (40-55%) also have good solubility but show a higher viscosity. Paint films made of medium oil length alkyds have better mechanical properties such as hardness and durability. Short oil length alkyds (less than 40%) require additional measures, such as the use of additional siccatives or amino resins, to obtain acceptable drying times. The reactive diluents according to the present invention can be used with alkyds of any oil length.

To support the oxidatively drying mechanism, siccatives or driers can be used. Examples of suitable siccatives are metal salts of aliphatic acids, including cycloaliphatic acids, or aromatic acids, such as ethylhexanoic acid, octanoic acid, and naphthenic acid, where the metal is, for example, cobalt, manganese, lead, vanadium, iron, zirconium, calcium, copper, potassium, lithium, zinc, aluminium, magnesium, bismuth, or a rare earth metal. Alternatively, the siccative may be selected from metal oxide acetylacetonates, metal acetylacetonates, metal chlorides, metal sulphates, and metal alcoholates, where the metal is, for example, selected from the above-mentioned metals. Typically, mixtures of siccatives are used. The siccatives (calculated as metal) are usually applied in an amount of 0.001 to 3 wt. %, calculated on the total binder solids content.

Besides these siccatives, the coating composition may optionally comprise drying-accelerating complexing agents, for example, 2,2'-bipyridyl and 1,10-phenantroline. The complexing agents can be added in an amount of 0-3 wt. %, e.g., 0.1-1.5 wt. %, based on the weight of the total binder.

The composition is particularly suitable for formulation as a solvent borne coating composition. The reactive diluents of the present invention can be used to reduce the volatile organic content (VOC) below 300 g/l, a so-called high solids composition (solids content more than about 60%). However, it is also suitable for conventional coating compositions with a higher solvent content. In this context, VOC is determined in accordance with US standard ASTM D 2369 (one hour at 110° C.). Suitable solvents are for instance aromatic solvents such as toluene or xylene, as well as aliphatic solvents such as ethyl diglycol, ethyl glycol acetate, butyl glycol, butyl glycol acetate, butyl diglycol, butyl diglycol acetate, and methoxypropylene glycol acetate. Commercially available solvents are for instance Shellsol® D40, an aliphatic hydrocarbon solvent available from Shell, Dowanol® PMA from Dow, and Solvesso®-150, available from ExxonMobil.

Alternatively, the reactive diluents according to the invention can be used in an oxidatively drying water borne composition, e.g., by mixing them into alkyd emulsions, optionally comprising co-solvents or humectants, such as glycols. Particularly useful for water borne compositions are reactive diluents with ionic or non-ionic stabilizing groups. These groups can for example be obtained by using diols or diesters containing carboxyl, sulfosuccinate or polyethylene glycol side groups.

The composition according to the invention can be used as a clear varnish or may contain pigments. Pigments can ordinarily include opacifying pigments, such as titanium dioxide, zinc oxide, leaded zinc oxide, or tinting pigments, such as carbon black, yellow oxides, brown oxides, tan oxides, raw and burnt sienna or umber, chromium oxide green, phthalocyanine green, phthalonitrile blue, ultramarine blue, cadmium pigments or chromium pigments. Fillers can also be added, such as clay, silica, talc, or mica.

The coating composition can furthermore contain one or more additives such as UV stabilizers, cosolvents, dispersants, surfactants, inhibitors, fillers, anti-static agents, flame-retardant agents, lubricants, anti-foaming agents, extenders, plasticizers, anti-freezing agents, waxes, thickeners, or thixotropic agents. Furthermore, the coating composition according to the invention may optionally comprise various anti-oxidants and anti-skinning agents.

The invention is further illustrated by the following examples. In the examples, the following commercially obtained compounds are used:

| | |
|---|---|
| Exkin ® 2 | anti-skinning agent (MEKoxim), available from Elementis; |
| Kronos ® 2310 | titanium dioxide, a white pigment available from Kronos; |
| Nerol 80 ® | a nerol - geraniol mixture, commercially available from DRT France s.a. |
| Nuodex ® Combi APB | a siccative composition comprising metal driers (cobalt, zirconium and calcium), commercially available from Elementis; |
| Shellsol ® D40 | an aliphatic hydrocarbon solvent supplied by Shell; |

The following measuring methods were used:
VOC (volatile organic content) was determined according to ASTM D2369 (1 hour at 110° C.);
Viscosity was determined on a Brookfield® CAP2000 cone and plate viscometer at 23° C.;
Gel Permeation Chromatography was performed with a PL 100 Column, Refractive Index detector, and THF/Acetic acid (0.5%) as eluent, using polystyrene calibration;
Nuclear Magnetic Resonance measurements were performed with a Bruker AC300 Nuclear Magnetic Resonance meter;
Colour was determined using a reference set of Gardner colour tubes;
Yellowing was determined as follows. A 30-micrometer dry film was applied on a glass plate. After 1 week's drying of the paint the L, a, b values of the paint (according to CIE lab, ASTM-E313) were determined with a MacbethColorEye® 7000A. Subsequently, these panels were placed in a dark 50° C. oven for 600 hours and the L, a, b values were measured again. The difference in b-value is denoted as the yellowing.
The drying time was measured as follows. Before testing paints were stored for two weeks at 35° C. The coating composition was applied on a glass plate with a draw bar in a dry layer thickness of 30 µm. Curing took place at 10° C. and 80% humidity in a climatized room under TL-055 light. Drying was tested by means of a BK drying recorder. The end of BK phase 3, which is reached when the coating is not damaged down to the substrate anymore, was recorded as the drying time.

EXAMPLE 1

An amount of 175 g of dimethylester of malonic acid and 420 g of nerol and dibutyl tin oxide (1,500 ppm) were transferred to a flask fitted with a stirrer, a thermometer, a nitrogen inlet, and a condensor. The mixture was put under a nitrogen atmosphere and heated to 150° C. At 130° C. the transesterification starts, so methanol is formed and distills off. The mixture is heated at 150° C. during 20-24 hours. To remove the remaining free mono-alcohol, the flask is put under 20-40 mbar vacuum for an hour. A small stream of nitrogen is passed through the flask. The conversion is determined by $^1$H-NMR.

The resulting product is a clear low-viscosity liquid, with >90% purity according to $^1$H-NMR and GPC measurements. Colour is 7 Gardner.

EXAMPLE 2

An ester was prepared of 400.5 g of nerol and 220 g of dimethyl succinate using the same process as in Example 1.

The resulting product is a clear low-viscosity liquid, with >93% purity according to $^1$H-NMR and GPC measurements. Colour is 3 Gardner.

EXAMPLE 3

Dimethyl isobutylidene malonate was prepared by mixing dimethyl malonate (5 moles), isobutyraldehyde (5 moles), 530 g of toluene, 2.8 g of piperidine, and 2.93 g of propionic acid in a flask fitted with a stirrer, a thermometer, a nitrogen inlet, and a condenser. The mixture was heated until reflux. Water was separated via a Dean Stark trap. Every 2 hours half of the starting amounts of piperidine and propionic acid were added to the flask. After 3 days 130 g of toluene and 2 moles of isobutyraldehyde were additionally added. The reaction is finished when the theoretical amount of water is collected or when $^1$H-NMR shows no remaining free methylene group of the malonate. When the reaction is complete, part of the toluene is evaporated under vacuum. After cooling to room temperature, 300 g of diethyl ether are added to the residue and the product is washed with water, then once with 0.05 N HCl to remove piperidine, again with water, then with 4% $Na_2CO_3$ to remove propionic acid, next twice with water to neutralize. The organic phase is dried on $MgSO_4$ and the solvent is evaporated.

Subsequently, an ester was prepared of 224 g of the obtained dimethyl isobutylidene malonate and 322.6 g of nerol as in Example 1.

EXAMPLE 4

An amount of 290 g of dimethyl malonate, 371.1 g of nerol, 117.2 g of hexane diol, and dibutyltinoxide (1,500 ppm) were transferred to a flask fitted with a stirrer, a thermometer, a nitrogen inlet, and a condensor. The mixture was put under a nitrogen atmosphere and heated to 150° C. At 130° C. methanol is formed and is distilled off. The mixture is heated at 150° C. during 20-24 hours. To remove the remaining free mono-alcohol, the flask is put under 20-40 mbar vacuum for an hour. A small stream of nitrogen is passed through the flask. The conversion is determined by $^1$H-NMR.

EXAMPLE 5

An ester was prepared of 148.4 g of dimethyl malonate, 190 g of geraniol, and 60.9 g of hexane diol using the same process as in Example 4.

EXAMPLE 6

An ester was prepared of 290 g of dimethyl malonate, 371.3 g of the commercial product Nerol 80®, and 117.2 g of hexane diol using the same process as in Example 4.

EXAMPLE 7

An ester was prepared of 466.6 g of dimethyl isobutylidene malonate (prepared according to Example 4), 471 g of nerol, and 180 g of dimethylol cyclohexane using the same process as in Example 4.

EXAMPLE 8

An ester was prepared of 252.7 g of nerol and 200 g of the dimethyl ester of 2,6-naphthalene dicarboxylic acid using the same process as in Example 1. The resulting product is a clear low-viscosity liquid, with >93% purity according to $^1$H-NMR and GPC measurements. Viscosity is 0.22 Pa·s. Colour is 3-4 Gardner.

EXAMPLE 9

An ester was prepared of 400.5 g of nerol and 200 g of dimethyl itaconate using the same process as in Example 1.

The resulting product is a clear low-viscosity liquid, with >75% purity according to $^1$H-NMR and GPC measurements. Some nerol and nerol monoester are present. Colour is 2-3 Gardner.

EXAMPLE 10

An ester was prepared of 300 g of dimethyl isophthalate, 262.2 g of nerol, and 100 g of dimethylol cyclohexane using the same process as in Example 5.

The resulting product is a slightly turbid low-viscosity resin, clear after filtration. GPC (Mn/Mw) results: 552/681. Colour is 3 Gardner.

EXAMPLE 11

An ester was prepared of 300 g of dimethyl cyclohexane dicarboxylate, 254.6 g of nerol, and 108 g of butyl ethyl propane diol using the same process as in Example 5. The resulting product is a clear low-viscosity resin. GPC (Mn/Mw) results: 456/581. Colour is 3 Gardner.

EXAMPLE 12

An ester was prepared of 175 g of the diethyl ester of 4-methyl tetrahydro-phthalic acid, 124 g of nerol, and 52.5 g of butyl ethyl propane diol using the same process as in Example 4. The resulting product is a hazy low-viscosity resin, clear after filtration. GPC (Mn/Mw) results: 438/527. Colour is 5 Gardner.

EXAMPLE 13

An ester was prepared of 220 g of diethyl carbonate, 316.5 g of nerol, and 120.9 g of dimethylol cyclohexane using the same process as in Example 4. The resulting product is a clear low-viscosity resin. GPC (Mn/Mw) results: 425/614. Colour is 5-6 Gardner.

EXAMPLE 14

An ester was prepared of 82.1 g of diethyl maleate, 73.6 g of nerol, and 38.2 g of butyl ethyl propane diol using the same process as in Example 5. Subsequently, this material was modified by addition of sodium bisulfite onto the maleate double bonds as follows: Resin and 9.9 g sodium bisulfite were reacted at 95° C. in a solvent mixture of 20 g of water and 30 g of methoxypropanol (Dowanol® PM). Subsequently solvents were removed by evaporation. This results in a clear low-viscosity diluent that dissolves in water at various solids contents.

COMPARATIVE EXAMPLE 1

An ether-ester was prepared of dimethyl maleate, 2,7-octadienol, and zinc acetate catalyst according to Example S1 of patent WO 97/02230.
Paint Composition To test the esters prepared in Examples 1-7 and Comparative Example 1 as reactive diluents in alkyd paints, paints were prepared on the basis of a high solids alkyd with a viscosity of 10 Pa·s at 23° C. The alkyd was used as its 90% Shellsol® D40 solution. Paint compositions were prepared by mixing 127 parts by weight of the esters prepared in Examples 1-13 with 295 wt. parts of the alkyd binder, 333 wt. parts Kronos® 2310, 9.4 wt. parts of a pigment dispersing agent, 31.5 wt. parts Nuodex® Combi APB, and 2.2 wt. parts Exkin® 2. The paint was diluted with Shellsol® D40 to an application viscosity of 0.5 Pa·s. The paint properties of the various paints are shown in Table 1.

TABLE 1

| Reactive diluent of: | VOC (g/l) | Drying (hrs) BK phase 1-3 | Yellowing (Δb value 600 hrs) |
|---|---|---|---|
| Example 1 | 137 | 8.2 | 3.7 |
| Example 2 | 135 | 8.7 | 3.6 |
| Example 3 | 149 | 7.3 | 3.3 |
| Example 4 | 174 | 6.7 | 4.1 |
| Example 5 | 188 | 8.6 | 3.5 |
| Example 6 | 194 | 7.5 | 3.5 |
| Example 7 | 202 | 5.7 | 3.3 |
| Comp. Example 1 | 163 | 8.5 | 6.4 |

The invention claimed is:

1. A coating composition comprising an oxidatively drying binder and a reactive diluent, wherein at least a part of the diluent is an ester of a polyunsaturated alcohol and a compound comprising one or more carboxylic acid groups, the ester being without chain-end double bonds;
   wherein the polyunsaturated alcohol is selected from the group consisting of geraniol, nerol, and farnesol;
   wherein said compound comprising one or more carboxylic acid groups is a dicarboxylic acid selected from the group consisting of malonic acid, succinic acid, itaconic acid, isophthalic acid, naphthalene dicarboxylic acid, cyclohexane dicarboxylic acid, tetrahydrophthalic acid, anhydrides of tetrahydrophthalic acid, and polyesters having two terminal groups with unreacted carboxylic acid moieties; and
   wherein the polyester further comprises one or more cycloalkyl building blocks.

2. The coating composition according to claim 1, wherein said dicarboxylic acid is malonic acid.

3. The coating composition according to claim 2, further comprising a building block derived from an aldehyde coupled to the malonate backbone by a Knoevenagel reaction.

4. The coating composition according to claim 3, wherein the aldehyde-derived building block is selected from the group consisting of isobutyl, benzyl, and cinnamyl.

5. The coating composition according to claim 1, wherein the binder is an alkyd.

6. The coating composition according to claim 1, further comprising one or more solvents.

7. The coating composition according to claim 1, wherein the composition is a water-borne composition.

8. The coating composition according to claim 1, wherein said polyester having two terminal groups with unreacted carboxylic acid moieties comprises at least one terminal malonate group.

9. The coating composition according to claim 8, further comprising a building block derived from an aldehyde coupled to the malonate backbone by a Knoevenagel reaction.

10. The coating composition according to claim 3, wherein the binder is an alkyd.

* * * * *